United States Patent [19]
Guskey

[11] Patent Number: 5,504,231
[45] Date of Patent: Apr. 2, 1996

[54] PROCESS FOR PREPARING REDUCED CALORIE TRIGLYCERIDES WHICH CONTAIN SHORT OR MEDIUM AND LONG CHAIN FATTY ACIDS BUT WHICH CONTAIN LOW LEVELS OF DIFATTY KETONES

[75] Inventor: Gerald J. Guskey, Montgomery, Ohio

[73] Assignee: The Procter & Gamble Company, Cincinnati, Ohio

[21] Appl. No.: 307,116

[22] Filed: Sep. 16, 1994

[51] Int. Cl.$^6$ .................... C11B 3/02; C11C 3/10
[52] U.S. Cl. .................... 554/206; 554/169; 554/207; 426/804
[58] Field of Search .................... 884/169; 554/206, 554/207; 426/804

[56] References Cited

U.S. PATENT DOCUMENTS 5,142,071  8/1992  Kluesener et al. .................... 554/172
5,258,197  11/1993  Wheeler et al. .................... 426/607
5,288,512  2/1994  Seiden .................... 426/607

Primary Examiner—José G. Dees
Assistant Examiner—Deborah D. Carr
Attorney, Agent, or Firm—Tara M. Rosnell; Leonard Williamson; Rose Ann Dabek

[57] ABSTRACT

The present invention relates to a process for preparing reduced calorie triglycerides which contain short or medium chain and long chain fatty acids, but which nevertheless contain low levels of difatty ketones. The process of the present invention comprises the step of adding glycerine to a crude reaction product after a selective esterification reaction of a monoglyceride with short or medium chain fatty acids fatty acids. The glycerin is typically added at a level of from about 0.1 to about 1.0% at a reaction temperature of from about 170° C. to about 215° C. The contact time is about 1 to about 15 minutes. The reduced calorie triglycerides prepared according to this process will contain less than about 100 ppm difatty ketones.

15 Claims, No Drawings

PROCESS FOR PREPARING REDUCED CALORIE TRIGLYCERIDES WHICH CONTAIN SHORT OR MEDIUM AND LONG CHAIN FATTY ACIDS BUT WHICH CONTAIN LOW LEVELS OF DIFATTY KETONES

TECHNICAL FIELD

The present invention relates to a process for preparing reduced calorie triglycerides which contain short or medium and long chain fatty acids, but which nevertheless contain low levels of difatty ketones. The process comprises the step of adding a hydroxyl-containing compound to the reduced calorie triglyceride at some point during the preparation of the reduced calorie triglyceride in order to remove fatty acid anhydrides which are precursors to difatty ketones.

BACKGROUND OF THE INVENTION

Reduced calorie fats which are made from triglycerides containing short or medium and long chain fatty acids have been disclosed for use as a replacement for conventional triglyceride fats in food products. See, for example, Seiden; U.S. Pat. No. 5,288,512; Issued Feb. 22, 1994 which discloses reduced calorie fat compositions comprising at least about 15% by weight triglycerides selected from the group MML, MLM, LLM, and LML triglycerides and mixtures thereof; wherein M=fatty acids selected from the group consisting of $C_6$ to $C_{10}$ saturated fatty acids, and mixtures thereof, and L=fatty acids selected from the group consisting of $C_{17}$ to $C_{26}$ saturated fatty acids, and mixtures thereof. See also Wheeler et al; U.S. Pat. No. 5,258,197; Issued Nov. 2, 1993, which discloses reduced calorie fat compositions containing at least about 25% by weight triglycerides selected from the group SSL, SLS, LLS, LSL and mixtures thereof; wherein S-fatty acids selected from the group consisting of $C_{18}$ to $C_{22}$ saturated fatty acid and mixtures thereof.

Reduced calorie triglycerides containing short or medium and long chain fatty acids can be prepared by a variety of techniques including the selective esterification of long chain fatty acid monoglycerides with short or medium chain fatty acids. See, for example, Kluesener et al; U.S. Pat. No. 5,142,071; Issued Aug. 25, 1993 which discloses a process for the selective esterification of long chain monoglycerides, particularly monobehenin, with medium chain fatty acids, particularly a mixture of $C_8$ and $C_{10}$ fatty acid. In this process, an at least about 60% pure $C_{18}$–$C_{24}$ fatty acid monoglyceride, or mixture thereof, is esterified with an at least about 90% pure $C_6$–$C_{10}$ fatty acid or mixture thereof at a temperature of from about 140° C. to about 250° C. in the substantial absence of an esterification catalyst. The mole ratio of fatty acid to monoglyceride used in this monoglyceride esterification is at least about 3:1.

Unfortunately, preparation of reduced calorie triglycerides containing short or medium chain and long chain fatty acids by esterification of monoglycerides with short or medium chain fatty acids can result in the formation of fatty acid anhydrides which can be converted to difatty ketones during purification of the reduced calorie triglycerides. As a result, reduced calorie triglycerides prepared according to this type of process can contain high levels of difatty ketones. For example, these reduced calorie triglycerides can contain up to about 1% (10,000 ppm) difatty ketones. Levels of difatty ketones OffTOm about 100 to about 1000 ppm are typical for these reduced calorie triglycerides. Difatty ketones are difficult to remove from the reduced calorie triglyceride and can contribute to flavor instability and formation of bloom in chocolate applications and can act as a crystal inhibitor.

It would therefore be desirable to provide a process for preparing reduced calorie triglycerides which contain short or medium and long chain fatty acids, but which nevertheless do not contain unacceptably high levels of difatty ketone. It has now been found that the level of difatty ketones present in the reduced calorie triglyceride can be reduced by up to 95% (e.g. to about 10–20 ppm) by adding a hydroxyl-containing compound, such as glycerine, to the crude reduced calorie triglyceride at some point during the preparation of the reduced calorie triglycerides described herein. Adding the hydroxyl-containing compound removes fatty acid anhydrides, and thereby prevents the formation of difatty ketones.

SUMMARY OF THE INVENTION

The present invention relates to a process for preparing reduced calorie triglycerides which contain short or medium chain and long chain fatty acids, but which nevertheless contain low levels of difatty ketones. The process of the present invention comprises the step of adding a hydroxyl-containing compound to the reduced calorie triglyceride sometime during the preparation of the reduced calorie triglycerides. The reduced calorie triglycerides prepared according to this process will contain less than about 100 ppm difatty ketones.

DETAILED DISCLOSURE OF THE INVENTION

The present invention relates to a process for preparing reduced calorie triglycerides which contain short or medium chain and long chain fatty acids, but which nevertheless contain low levels of difatty ketones. Because they contain low levels of difatty ketones, reduced calorie triglycerides prepared according to the process of the present invention are especially suitable for use in foods, particularly in chocolate applications. The reduced calorie triglycerides prepared according to the process of the present invention which are low in difatty ketones also have desirable flavor stability.

By "short chain fatty acids", as used herein, is meant fatty acids having from 2 to 5 carbons. $C_{2:0}$ (acetic), $C_{3:0}$ (propionic), $C_{4:0}$ (butyric) or mixtures thereof are preferred. Short chain fatty acids may be saturated or unsaturated, straight or branched, and may be derived from any synthetic or natural organic acid.

By "medium chain fatty acids," as used herein, is meant $C_{6:0}$ (caproic), $C_{8:0}$ (caprylic), or $C_{10:0}$ (capric) fatty acids, or mixtures thereof. The $C_7$ and $C_9$ saturated fatty acids are not commonly found, but they arc not excluded from the possible medium chain fatty acids. The present medium chain fatty acids do not include lauric acid ($C_{12:0}$), sometimes referred to in the art as a medium chain fatty acid. Medium chain fatty acids for use in the process of the present invention can be derived from a number of different sources. For example, medium chain saturated fatty acids can be obtained from coconut palm kemel or babassu oils. They can also be obtained from commercial medium chain triglycerides, such as the Captex 300 brands sold by Capital City Products of Columbus, Ohio. Typically, these sources of medium chain fatty acids are subjected to hydrolysis to provide a mixture of free fatty acids, followed by solventless fractionation to provide a fatty acid fraction enriched in the medium chain fatty acids. Generally the source of medium chain fatty acids is at least about 90% pure in medium chain fatty acids.

By "long chain fatty acids," as used herein, is meant $C_{17:0}$ (margaric), $C_{18:0}$ (stearic), $C_{19:0}$ (nonadecylic), $C_{20:0}$ (arachidic), $C_{21:0}$ (heneicosanoic), $C_{22:0}$ (behenic), $C_{23:0}$ (tricosanoic), $C_{24:0}$ (lignoceric), $C_{25:0}$ (pentacosanoic), or $C_{26:0}$ (cerotic) fatty acids, or mixtures thereof. The long chain fatty acids per se or naturally occurring fats and oils can serve as sources of the long chain fatty acids. For example, soybean oil and high erucic acid rapeseed oil hydrogenated to an Iodine Value of about 10 or less are good sources or stearic and behenic acids, respectively. Odd chain length long chain fatty acids can be derived from certain marine oils. Alternatively, mixed chain length monoglycerides can be fractionated to provide a source of long chain fatty acids. Generally the source of long chain fatty acids is at least about 90% pure in long chain fatty acids.

The reduced calorie triglycerides prepared by the process of the present invention must contain short or medium chain fatty acids and long chain fatty acids. In one preferred embodiment, the reduced calorie triglycerides prepared according to the process of the present invention comprises at least about 15% by weight of reduced calorie triglycerides selected from the group consisting of MML, MLM, LLM, and LML triglycerides, and mixtures thereof, wherein M-fatty acids selected from the group consisting of $C_6$ to $C_{10}$ saturated fatty acids and mixtures thereof and L=fatty acids selected from the group consisting of C17 to C26 saturated fatty acids and mixtures thereof. Such reduced calorie triglycerides further comprise at least about 10% by weight of a mixture of MML and MLM triglycerides, more preferably at least about 35% by weight of such combined triglycerides, and most preferably at least about 70% by weight of such combined triglycerides.

By "MML," as used herein, is meant a triglyceride containing a long chain fatty acid in the #1 or #3 position (an end position) with two medium chain fatty acids in the remaining two positions. Similarly, "MLM" represents a triglyceride with a long chain fatty acid in the #2 position (the middle position) and two medium chain fatty acids in the #1 and #3 positions, "LLM" represents a triglyceride with a medium chain fatty acid in the #1 or #3 position and two long chain fatty acids in the remaining two positions, and "LML" represents a triglyceride with a medium chain fatty acid in the #2 position and two long chain fatty acids in the #1 and #3 positions.

Preferred combinations of medium and long chain fatty acids present in the triglycerides prepared by the process of the present invention are described in Seiden; U.S. Pat. No. 5,288,512; Issued Feb. 22, 1994, herein incorporated by reference.

In another preferred embodiment, the reduced calorie triglycerides prepared according to the process of the present invention contain at least about 25% triglycerides selected from the group SSL, SLS, LLS, LSL and mixtures thereof; wherein S=fatty acids selected from the group consisting of $C_2$–$C_5$ saturated fatty acids and mixtures thereof and wherein L=fatty acids selected from the group consisting of $C_{18}$ to $C_{22}$ saturated fatty acid and mixtures thereof. See, for example, Wheeler et al., U.S. Pat. No. 5,258,197; Issued Nov. 2, 1993 (herein incorporated by reference).

By "SSL," as used herein, is meant a triglyceride containing a long chain fatty acid in the #1 or #3 position (an end position) with two short chain fatty acids in the remaining two positions. Similarly, "SLS" represents a triglyceride with a long chain fatty acid in the #2 position (the middle position) and two short chain fatty acids in the #1 and #3 positions, "LLS" represents a triglyceride with a short chain fatty acid in the #1 or #3 position and two long chain fatty acids in the remaining two positions, and "LSL" represents a triglyceride with a short chain fatty acid in the #2 position and two long chain fatty acids in the #1 and #3 positions.

Reduced calorie triglycerides containing short or medium and long chain fatty acids are typically prepared by the selective esterification of a monoglyceride with short or medium chain fatty acids. See, for example, Kluesener et al; U.S. Pat. No. 5,142,071; Issued Aug. 25, 1992 (herein incorporated by reference) which discloses a process for the selective esterification of long chain fatty acid monoglycerides, particularly monobehenin, with medium chain fatty acids, particularly a mixture of $C_8$ and C10 fatty acids. In this process, an at least about 60% pure $C_{18}$–$C_{24}$ fatty acid monoglyceride or mixture thereof is esterified with an at least about 90% pure $C_6$–$C_{10}$ fatty acid or mixture thereof at a temperature of from about 140° C. to about 250° C. in the substantial absence of an esterification catalyst. The mole ratio of fatty acid to monoglyceride used in this monoglyceride esterification is at least about 3:1. Water generated during this monoglyceride esterification is continuously removed. In the selective esterification reactions, $C_8/C_{10}$ acids are reacted with monobehenin in a 16:1 mole ratio to form an MLM/MML triglyceride. The MLM/MML triglyceride is then purified by conventional means.

In this type of process, fatty acid anhydrides, especially medium chain (e.g., C8/C10) fatty acid anhydrides are formed during the esterification reaction. These fatty acid anhydrides can be converted to difatty ketones during the high temperature purification steps. Table I below illustrates how the level of fatty acid anhydride present in the reaction mixture increases during esterification of monobehenin.

TABLE I

FORMATION OF FATTY ACID ANHYDRIDES (FAA) DURING ESTERIFICATION OF MONOBEHENIN

| Time/h | C8 and C10 FAA (ppm) | C22 FAA (ppm) | ML-Diglycerides/(%) | MLM/MML Triglcerides (%) |
|---|---|---|---|---|
| 0 | <40 | <40 | — | — |
| 1.0 | 424 | <40 | 8.5 | 88.5 |
| 1.5 | 776 | <40 | 2.8 | 87.4 |
| 2.0 | 2516 | <40 | 0.4 | 87.3 |
| 2.5 | 4792 | 40 | 0.04 | 86.5 |

Reaction Temperature: 200° C.

TABLE I-continued

FORMATION OF FATTY ACID ANHYDRIDES (FAA) DURING ESTERIFICATION OF MONOBEHENIN

| Time/h | C8 and C10 FAA (ppm) | C22 FAA (ppm) | ML-Diglycerides/(%) | MLM/MML Triglcerides (%) |
|---|---|---|---|---|

Molar Ratio of 18:1.
Pressure: 200–400 mmHg.

Reduced calorie triglycerides wherein these mounts of fatty acid anhydrides are produced during the esterification reaction between a monoglyceride and medium chain fatty acids typically contain from about 100 to about 1000 ppm difatty ketones and can contain up to about 10,000 ppm difatty ketones.

The process of the present invention comprises the step of adding a hydroxyl-containing compound to the crude reduced calorie triglyceride at some point during the preparation of the reduced calorie triglyceride. Suitable hydroxyl-containing compounds for use in the process of this invention include glycerine, water and mono- and diglycerides, especially short or medium chain mono- and diglycerides. Glycerine and water are preferred hydroxyl-containing compounds for use in the process of the present invention. Glycerine is especially preferred.

The hydroxyl-containing compound is typically added to the crude reaction product at the end of the esterification reaction, but prior to purification of the reaction crude. However, the hydroxyl-containing compound can be added at any point where fatty acid anhydrides are present. The hydroxyl-containing compound reacts stoichiometrically with fatty acid anhydrides to form mono-, di- and triglycerides which can be easily removed from the reaction mixture. In this way, the level of difatty ketones present in the reduced calorie triglyceride product is reduced to less than about 100 ppm. Preferably, the reduced calorie triglycerides prepared according to the process of the present invention will have a difatty ketone content of less than about 50, more preferably less than about 20 ppm and most preferably less than about 10 ppm.

The hydroxyl-containing compound is typically added at levels ranging from about 0.01% to about 5%. Preferably, the hydroxyl-containing compound is added at a level of from about 0.05 to about 2%, more preferably from about 0.1% to about 1.0%, and most preferably from about 0.1% to about 0.5%. The temperature at which the hydroxyl-containing compound is added typically ranges from about 80 to about 255° C., preferably from about 150 to about 220° C., more preferably from about 170° to about 215° C. and most preferably from about 175° to about 200° C. The contact time over which the hydroxyl-containing compound is added typically ranges from about 1 to about 120 minutes, preferably from about 1 to about 60 minutes, more preferably from about 1 to about 30 minutes and most preferably from about 1 to about 15 minutes.

In general, as the mount of the hydroxyl-containing compound added increases, the reaction temperature and/or the contact time may be decreased. Likewise, as the temperature of the reaction mixture increases, the mount of the hydroxyl-containing compound added and/or the contact time may be decreased. As the contact time is increased, the mount of hydroxyl-containing compound added and/or the temperature can be decreased. It may be desirable to minimize the mount of excess of the hydroxyl-containing compound since an excess of the hydroxyl-containing compound can result in the formation of ML or SL diglycerides, which lowers the overall yield of reduced calorie triglycerides.

Table II below shows the levels of fatty acid anhydrides as a function of time after the addition of glycerine at various levels and reaction temperatures. Reactions with 0.1 to 1.0% glycerine at 200° C. have reduced the level of $C_8/C_{10}$ fatty acid anhydrides by 80–90% in a batch system. This translates to a reduction in difatty ketones of about 90%.

TABLE II

LEVELS OF FATTY ACID ANHYDRIDES (PERCENT) AS A FUNCTION OF TIME AFTER THE ADDITION OF GLYCERINE AT VARIOUS LEVELS AND REACTION TEMPERATURES

| Time/min. | 200° C., 4X | 150° C., 1X | 175° C., 1X | 200° C., 1X | 200° C., 4X | 200° C., 8X |
|---|---|---|---|---|---|---|
| 0  | 0.94 | 0.83 | 0.99 | 1.02 | 0.49 | 1.00 |
| 1  | 0.49 | —    | —    | 0.78 | —    | 0.36 |
| 2  | —    | —    | —    | —    | 0.10 | —    |
| 3  | 0.21 | —    | 0.60 | 0.56 | —    | 0.28 |
| 4  | —    | —    | —    | —    | 0.13 | —    |
| 5  | 0.17 | 0.54 | —    | 0.41 | —    | 0.36 |
| 6  | —    | —    | 0.45 | —    | 0.08 | —    |
| 7  | 0.13 | 0.58 | —    | 0.36 | —    | —    |
| 8  | —    | —    | —    | —    | 0.10 | —    |
| 9  | —    | 0.50 | 0.33 | —    | —    | 0.30 |
| 10 | 0.15 | —    | —    | 0.32 | 0.11 | —    |
| 11 | —    | 0.51 | —    | —    | —    | —    |
| 12 | —    | —    | 0.30 | —    | 0.10 | —    |
| 13 | 0.11 | 0.44 | —    | 0.28 | —    | —    |
| 15 | —    | —    | 0.29 | —    | —    | 0.27 |
| 16 | 0.13 | 0.41 | —    | 0.26 | 0.04 | —    |

TABLE II-continued

LEVELS OF FATTY ACID ANHYDRIDES (PERCENT) AS A FUNCTION OF TIME AFTER THE ADDITION OF GLYCERINE AT VARIOUS LEVELS AND REACTION TEMPERATURES

| Time/min. | 200° C., 4X | 150° C., 1X | 175° C., 1X | 200° C., 1X | 200° C., 4X | 200° C., 8X |
|---|---|---|---|---|---|---|
| 18 | — | — | 0.33 | — | 0.08 | — |
| 19 | 0.11 | 0.36 | — | 0.28 | — | — |
| 20 | — | — | — | — | 0.04 | — |
| 21 | — | — | 0.29 | — | — | — |
| 22 | — | 0.35 | — | — | — | — |
| 23 | 0.12 | — | — | 0.27 | — | — |
| 24 | — | — | 0.32 | — | — | — |
| 25 | — | — | — | — | 0.02 | 0.20 |
| 27 | 0.11 | — | 0.31 | — | — | — |
| 28 | — | 0.37 | — | 0.29 | — | — |
| 30 | — | — | 0.34 | — | 0.03 | — |
| 31 | — | 0.34 | — | — | — | — |
| 32 | 0.13 | — | — | — | — | — |
| 33 | — | — | — | 0.33 | — | — |
| 34 | — | — | 0.36 | — | — | — |
| 35 | — | 0.25 | — | — | — | — |
| 38 | — | — | 0.42 | — | — | — |
| 40 | 0.13 | 0.28 | — | — | 0.00 | 0.12 |
| 44 | — | — | — | 0.41 | — | — |
| 45 | — | — | 0.43 | — | — | — |
| 50 | 0.19 | 0.19 | — | 0.44 | — | — |
| 52 | — | — | 0.50 | — | — | — |
| 60 | — | — | 0.55 | — | 0.04 | 0.17 |
| 75 | — | 0.10 | — | — | — | — |

Note: 4X means 4 mols of glycerine to one mol of FAA.

Table III shows the effect of glycerine addition on the formation of ML diglycerides and on the overall yield of reduced calorie triglycerides. The reduced calorie triglyceride product prepared according to the process of the present invention also typically contain less than about 1.0% ML or SL -diglyceride impurities, preferably less than about 0.5 % ML or SL diglyceride impurities, and more preferably less than about 0.2% ML or SL diglyceride impurities. As a result, the overall yield of MML/MLM or SSL/SLS triglycerides according to the process of the present invention prior to purification is generally greater than about 60%, preferably greater than about 70%, more preferably greater than about 75%.

TABLE III

Effect of Glycerine Addition on MLM/MML Purity and Formation of ML-Diglycerides

| Components | Feed/% | Product/% 4:1 Molar (0.5% glycerine) | Product/% 1:1 Molar (0.1% glycerine) |
|---|---|---|---|
| $C_8/C_{10}$ anhydride | 0.50 | 0.08 | 0.30 |
| glycerine | 0.00 | 0.12 | 0.00 |
| $C_8/C_{10}$ monoglycerides | 0.00 | 0.16 | 0.00 |
| $C_8/C_{10}$ diglycerides | 0.11 | 0.29 | 0.15 |
| MMM | 1.17 | 1.36 | 1.40 |
| ML-diglycerides | 0.17 | 0.15 | 0.15 |
| $C_{22}$ acid | 0.96 | 1.02 | 0.98 |
| MML/MLM | 14.1 | 14.1 | 14.1 |
| MLL/LML | 0.64 | 0.65 | 0.62 |

Reaction Temperature: 200° C.
Pressure: 200–400 mmHg
Molar Ratio of fat acid to monobehenin = 18:1
Contact time ~5 minutes Purification of the reduced calorie triglycerides prepared according to the process of the present invention can be carried out by a variety of techniques or combinations of techniques. For example, fatty acids, such as unreacted short or medium chain fatty acids, present in the reaction mixture can be removed by precipitation as salts (e.g., by addition of a base such as potassium carbonate), by the use of reverse osmosis membranes (e.g., NIRO HR polyamid polysulfane thin composite membranes) having a low (e.g., 200 molecular weight) cutoff, by flash evaporation, by steam stripping, or by vacuum distillation to decrease the level of fatty acids in the reaction mixture to about 2% or less (as oleic acid). MMM or SSS triglycerides, and any residual fatty acids can be removed by, for example, flash evaporation, evaporation using a wiped film evaporator (e.g., at temperatures of 200° to 240° C., and at pressures of 0.1–0.5 mmHg), molecular distillation (e.g., at 180°–225° C. and 1–20 microns pressure, preferably with the fatty acids/MMM/SSS triglycerides as the distillate fraction) or by fractional crystallization using acetone, ethanol, methanol or hexane as the solvent to decrease the level of MMM or SSS triglycerides in the reaction mixture to about 3% or less and the level of residual fatty acids to about 0.5% or less (as oleic acid). MLL/LML or SLL/LSL triglycerides can be separated from the MML/MLM or SSL/SLS triglycerides by, for example, molecular distillation (e.g., at 200°–250° C. and 1–20 microns pressure, preferably with the MML/MLM or SSL/SLS triglycerides as the distillate fraction), solventless fractional crystallization (e.g., at 80° F. to promote crystal growth, followed by 70°–75° F. filtration), or solvent fractional crystallization using acetone, ethanol, methanol or hexane as the solvent to decrease the level of combined MLL/LML or SLL/LSL triglycerides in the reaction mixture to about 3 % or less. Surprisingly, the reaction mixture which typically contains free fatty acids is thermally stable, e.g., heating the reaction mixture for 1 hour at 240° C. does not cause significant rearrangement. Accordingly, a variety of thermal techniques can be used to purify the reaction mixture.

Any fatty acids, MMM or SSS triglycerides, MLL/LML or SLL/LSL triglycerides or diglycerides removed during purification can be recycled to provide sources of short or medium chain fatty acids or long chain fatty acid monoglycerides for further esterification according to the process of the present invention. Alternatively, these materials can be reincorporated into the esterification mixture at low levels for subsequent reaction to provide additional MML/MLM or SSL/SLS triglycerides. The purified mixture of MML/MLM or SSL/SLS triglycerides can also be subjected to bleaching and deodorizing steps for color and flavor/aroma improvement using conventional techniques well known in the fats and oil art. Alternatively, the reaction mixture can be bleached using conventional bleaching earth and/or activated carbon prior to purification. In the case of MML/MLM or SSL/SLS triglycerides which have unsaturated fatty acid residue, the MML/MLM or SSL/SLS triglycerides can be hydrogenated before or alter purification to convert the unsaturated fatty acid residues to saturated fatty acid residues.

The reduced calorie triglycerides according to the present invention which are low in difatty ketones can be used as reduced calorie fats to partially or totally replace normal triglyceride fat in an fat-containing food composition comprising fat and nonfat ingredients to provide reduced calorie benefits. In order to obtain a significant reduction in calories, it is necessary that at least about 50% of the total fat in the food composition, or at least about 20% of the caloric value of the food, comprise the reduced calorie fat. On the other hand, very low calorie and thus high desirable food compositions are obtained when the total fat comprises up to 100% of the reduced calorie fat, and up to about 50% of the calories.

The present reduced calorie fats are useful in a wide variety of food and beverage products. For example, the fats can be used in the production of baked goods in any form, such as mixes, shelf-stable baked goods, and frozen baked goods. Possible applications include, but are not limited to, cakes, brownies, muffins, bar cookies, wafers, biscuits, pastries, pies, pie crusts, and cookies, including sandwich cookies and chocolate chip cookies, particularly the storage-stable dual-textured cookies described in U.S. Pat. No. 4,455,333 of Hong & Brabbs. The baked goods can contain fruit, cream, or other fillings. Other baked good uses include breads and rolls, crackers, pretzels, pancakes, waffles, ice cream cones and cups, yeast-raised baked good, pizzas and pizza crusts, baked farinaceous snack foods, and other baked salted snacks.

In addition to their uses in baked goods, the reduced calorie fats can be used alone or in combination with other regular calorie fats and oils to make shortening and oil products. Suitable sources of regular fats and oils include, but are not limited to: 1) vegetable fats and oils such as soybean, corn, sunflower, rapeseed, low erucic acid rapeseed, canola, cottonseed, olive, safflower, and sesame seed; 2) meat fats such as tallow or lard; 3) marine oils; 4) nut fats and oils such as coconut, palm, palm kernel, or peanut; 5) milkfat; 6) cocoa butter and cocoa butter substitutes such as shea, or illipe butter; and 7) synthetic fats. Shortening and oil products include, but are not limited to, shortenings, margarines, spreads, butter blends, lards, salad oils, popcorn oils, salad dressings, mayonnaise, and other edible oils.

Certain of the present reduced calorie fats are especially useful in flavored confectionery compositions, particularly chocolate-flavored confectionery compositions. See U.S. application Ser. No. 329,619 to Albert M. Ehrman, Paul Seiden, Rose M. Weitzel and Robert L. White, (P&G Case 3948), filed Mar. 28, 1989, which is incorporated by reference. These flavored confectionery compositions comprise:

a. a flavor enhancer amount of a flavor component;

b. from about 25 to about 45% of a fat component comprising:
  (1) at least about 70% of a reduced calorie fat having:
    (a) at least about 85% combined MLM and MML triglycerides;
    (b) no more than about 5% combined LLM and LML triglycerides;
    (c) no more than about 2% LLL triglycerides;
    (d) no more than about 4% MMM triglycerides;
    (e) no more than about 7% other triglycerides;
    wherein M is a $C_6$ to $C_{10}$ saturated fatty acid residue and L is a $C_{20}$ to $C_{24}$ saturated acid residue;
    (f) a fatty acid composition having:
      (i) from about 40 to about 60% combined $C_8$ and $C_{10}$ saturated fatty acids,
      (ii) a ratio of $C_8$ to $C_{10}$ saturated fatty acids of from about 1:2.5 to about 2.5:1,
      (iii) from about 40 to about 60% behenic fatty acid,
  (2) up to about 15% milkfat;
  (3) up to about 20% cocoa butter;
  (4) no more than about 4% diglycerides; and
c. from about 55 to about 75% other nonfat confectionery ingredients. These compositions are preferably tempered according to the process disclosed in said Ehrman et al application which comprises the following steps:
  (I) forming a temperable flavored confectionery composition as defined above;
  (II) rapidly cooling the composition of step (I) to a temperature of about 57° F. or less so that the reduced calorie fat forms a sub α phase;
  (III) holding the cooled composition of step (II) at a temperature of about 57° F. of less for a period of time sufficient to form an effective amount of β-3 crystals from a portion of the sub α phase of the reduced calorie fat; and
  (IV) after step (III), warming the cooled composition to a temperature in the range of from above about 57° to about 72° F. in a manner such that: (a) the remaining portion of the reduced calorie fat transforms into a stable β-3 phase; and (b) the β-3 phase formed does not melt.

Certain of the present reduced calorie fats, like cocoa butter, can be crystallized into a stable β-3 phase. However, it has been found that the rate of crystallization of these reduced calorie fats into the β-3 phase is extremely slow under standard tempering conditions used with cocoa butter-based chocolate products. This rate is sufficiently slow so as to make cocoa butter-type tempering of flavored confectionery compositions containing these reduced calorie fats commercially unattractive.

Surprisingly, it has been found that tempering according to said Ehrman et al application provides a commercially attractive process that is simpler than even the standard tempering conditions used with cocoa butter-based chocolate products. In particular, this tempering process can be carded out during the normal warehousing and distribution of the flavored confectionery product. These desirable results are achieved by taking advantage of the ability of these reduced calorie fats to transform into the desired stable β-3 phase, via the less stable sub α phase. This transformation of the reduced calorie fats from the sub α phase to the stable β-3 phase according to this tempering process occurs without undesired bloom formation. The resulting tempered products also have the desired firmness and mouthmelt of cocoa butter-based chocolate products.

The present reduced calorie fats can also be fortified with vitamins and minerals, particularly the fat-soluble vitamins. U.S. Pat. No. 4,034,083 of Mattson (incorporated by reference herein) discloses polyol fatty acid polyesters fortified with fat-soluble vitamins. The fat-soluble vitamins include vitamin A, vitamin D, vitamin E, and vitamin K. Vitamin A is a fat-soluble alcohol of the formula $C_{20}H_{29}OH$. Natural vitamin A is usually found esterified with a fatty acid; metabolically active forms of vitamin A also include the corresponding aldehyde and acid. Vitamin D is a fats-soluble vitamin well known for use in the treatment and prevention of rickets and other skeletal disorders. Vitamin D comprises sterols, and there are at least 11 sterols with vitamin D-type activity. Vitamin E (tocopherol) is a third fat-soluble vitamin which can be used in the present invention. Four different tocopherols have been identified (alpha, beta, gamma and delta), all of which are oily, yellow liquids, insoluble in water but soluble in fats and oils. Vitamin K exists in at least three forms, all belonging to the group of chemical compounds known as quinones. The naturally occurring fat-soluble vitamins are K1 (phylloquinone), K2 (menaquinone), and K3 (menadione). The amount of the fat-soluble vitamins employed herein to fortify the present reduced calorie fat material can vary. If desired, the reduced calorie fats can be fortified with a recommended daily allowance (RDA), or increment or multiple of an RDA, of any of the fat-soluble vitamins or combinations thereof.

Vitamins that are nonsoluble in fat can similarly be included in the present reduced calorie fats. Among these vitamins are the vitamin B complex vitamins, vitamin C, vitamin G, vitamin H, and vitamin P. The minerals include the wide variety of minerals known to be useful in the diet, such as calcium, magnesium, and zinc. Any combination of vitamins and minerals can be used in the present reduced calorie fat.

The present reduced calorie fats are particularly useful in combination with particular classes of food and beverage ingredients. For example, an extra calorie reduction benefit is achieved when the fat is used with noncaloric or reduced calorie sweeteners alone or in combination with bulking agents. Noncaloric or reduced calorie sweeteners include, but are not limited to, aspartame; saccharin; alitame, thaumatin; dihydrochalcones; cyelamates; steriosides; glycyrrhizins, synthetic alkoxy aromatics, such as Dulcin and P4000; sucralose; suosan; miraculin; monellin; sorbitol, xylitol; talin; cyclohexylsulfamates; substituted imidazolines; synthetic sulfamic acids such as acesulfame, acesulfam-K and n-substituted sulfamic acids; oximes such as perilarline; rebaudioside-A; peptides such as aspartyl malonates and succanilic acids; dipeptides; amino acid based sweeteners such as gemdiaminoalkanes, meta-aminobenzoic acid, L-aminodicarboxylic acid alkanes, and amides of certain alphaaminodicarboyxlic acids and gem-diamines; and 3-hydroxy-4-alkyoxyphenyl aliphatic carboxylates or heterocyclic aromatic carboxylates.

The reduced calorie fats can be used in combination with other noncaloric or reduced calorie fats, such as branched chain fatty acid triglyceride, triglycerol ethers, polycarboxylic acid esters, sucrose polyethers, neopentyl alcohol esters, silicone oils/siloxanes, and dicarboxylic acid esters. Other partial fat replacements useful in combination with the reduced calorie fats are medium chain triglycerides, highly esterified polyglycol esters, acetin fats, plant sterol esters, polyoxyethylene esters, jojoba esters, mono/diglycerides of fatty acids, and mono/diglycerides of short-chain dibasic acids.

Certain of the present reduced calorie fats are particularly useful in reduced calorie fat composition comprising certain substantially nonabsorbable, substantially nondigestible polyol polyesters. See. U.S. application Ser. No. 329,629 to Paul Seiden, Corey J. Kenneally, Thomas J. Wehmeier, Mary M. Fox and Raymond L. Niehoff (P&G Case 3947), filed Mar. 28, 1989, which is incorporated by reference. These reduced calorie fat compositions comprise:

a. from about 10 to about 65% of an edible, substantially nonabsorbable, substantially nondigestible polyol fatty acid polyester having at least 4 fatty acid ester groups, wherein the polyol is selected from sugars and sugar alcohols containing from 4 to 8 hydroxy groups and wherein each fatty acid group has from 2 to 24 carbon atoms; and b. from about 35 to about 90% reduced calorie triglycerides selected from MMM, MLM, MML, LLM, LML and LLL triglycerides, and mixtures thereof; wherein M is a saturated fatty acid residue selected from $C_6$ to $C_{10}$ saturated fatty acids, and mixtures thereof; wherein L is a saturated fatty acid residue selected from $C_{18}$ to $C_{24}$ saturated fatty acids, and mixtures thereof; wherein the reduced calorie triglycerides comprise: (1) at least about 85% combined MLM, MML, LLM and LML; and (2) up to about 15% combined MMM and LLL triglycerides, and wherein the fatty acid composition of the reduced calorie triglycerides comprises: (1) from about 10 to about 70% $C_6$ to $C_{10}$ saturated fatty acids; and (2) from about 30 to about 90% $C_{18}$ to $C_{24}$ saturated fatty acids.

Food products can comprise these reduced calorie fat compositions as the sole fat ingredient, or in combination with other fat ingredients such as triglyceride oils. These food products include frying oils for salted snacks and other fried foods, firm chocolate-flavored products such as chocolate-flavored candy bars or chips, as well as cooking and salad oils that are clear at room temperature, i.e., about 70° F. (21.1 ° C.), and preferably at lower temperatures, e.g., at about 50° F. (10° C.)

Surprisingly, certain of the present reduced calorie fats can function as anti-anal leakage agents for the polyol polyesters. In addition, the combination of the polyol polyesters with these reduced calorie fats provides significant advantages over the use of either component along. The advantages provided by these combinations include: (1) increased calorie reduction; (2) textural/taste benefits (e.g., less waxiness/greasiness, improved mouthmelt); (3) less color degradation during frying; and (4) less high temperature volatility and foaming during frying.

Bulking or bodying agents are useful in combination with the reduced calorie fats in many food combinations. The bulking agents can be nondigestible carbohydrates, for example, polydextrose and cellulose or cellulose derivatives, such as carboxymethylcellulose, carboxyethylcellulose, hydroxypropylcellulose, methylcellulose and microcrystalline cellulose. Other suitable bulking agents include gums (hydrocolloids), starches, dextrins, fermented whey, tofu, maltodextrins, polyols, including sugar alcohols, e.g. serbitel and mannitel, and carbohydrates, e.g. lactose.

Similarly, food and beverage compositions can be made that combine the present reduced calorie fats with dietary fibers to achieve the combined benefits of each. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and man-made fibers (for example, by bacterial synthesis). Commercial fibers such as purified plant cellulose, or cellulose flour, can also be used. Naturally occurring fibers include fiber from whole citrus peel, citrus albedo, sugar beets, citrus pulp and vesicle solids, applies, apricots, and watermelon finds.

These dietary fibers may be in a crude or purified form. The dietary fiber used may be of a single type (e.g. cellulose), a composite dietary fiber (e.g. citrus albedo fiber containing cellulose and pectin), or some combination of fibers (e.g. cellulose and a gum). The fibers can be processed by methods known to the art.

The reduced calorie fats can also contain minor amounts of optional flavorings, emulsifiers, anti-spattering agents, anti-sticking agents, antioxidants, or the like.

Of course, judgment should be exercised to make use of appropriate reduced calorie fats and combinations of these fats with other food ingredients. For example, a combination of sweetener and fat would not be used where the specific benefits of the two are not desired. The fat and fat ingredient combinations are used where appropriate, and in the proper amounts.

Many benefits are obtained from the use of the present reduced calorie fats in food and beverage compositions, either when used alone or in combination with the ingredients discussed above. A primary benefit is the calorie reduction achieved when the fat is used as a total or partial fat replacement. This calorie reduction can be increased by using combinations of the present fats with reduced calorie sweeteners, bulking agents, or other reduced calorie of noncaloric fats. Another benefit which follows from this use is a decrease in the total amount of fats in the diet. Foods or beverages made with the reduced calorie fats instead of triglyceride fats will also contain less cholesterol, and the ingestion of these food can lead to reduced serum cholesterol and thus reduced risk of heart disease.

A related benefit is that the use of the reduced calorie fats allows the production of foods and beverages that are stable in terms of shelf stability and penetration stability. Compositions made with the reduced calorie fats have acceptable organoleptic properties, particularly taste and texture.

Dietary foods can be made with the reduced calorie fats to meet special dietary needs, for example, of person who are obese, diabetic, or hypercholesterolemic. The reduced calorie fat can be a major part of a low-fat, low-calorie, low-cholesterol diet, and they can be used alone or in combination with drug therapy or other therapy. Combinations of food or beverage products made with the reduced calorie fat can be used as part of a total dietary management regimen, based on one or more of these products, containing the reduced calorie fat alone or in combination with one or more of the above-mentioned ingredients, to provide one or more of the above-mentioned benefits.

This discussion of the reduced calorie fats uses, combinations, and benefits, is not intended to be limiting or all-inclusive. It is contemplated that other similar uses and benefits can be found that will fall within the spirit and scope of this invention.

ANALYTICAL TEST METHODS

A number of parameters used to characterize elements of the process of the present invention are quantified by particular experimental analytical procedures. Each of these procedures is described in detail as follows:

1) Method for Measuring the Level of Fatty Acid Anhydrides in a Reaction Mixture This method utilizes temperature programmed gas chromatography (GC) via a short fused silica column (Supelco) coated with methyl silicone (DB-1) for analysis and characterization oft he compounds present in a sample composition by molecular weight of the compounds. Fatty acids eluted first, followed by short or medium chain monoglycerides, short or medium chain fatty acid anhydrides, short or medium chain diglycerides, long chain monoglycerides, long chain fatty acid anhydrides, and finally triglycerides.

Preparation of a sample is as follows. One drop of sample (about 10 milligrams) is pipetted into a vial. About 500 microliters of Dipropyl Amine (Sigma) is pipetted into the vial which is then capped. The vial is shaken vigorously and then placed in a heating block (100° C.) for 5 minutes. A Hewlett-Packard 5890 series gas chromatograph equipped with a 7673A automatic injection system and a flame ionization detector is used, along with a Hewlett-Packard 3396A integrator. A 2 m long, 0.22 mm diameter fused silica capillary column coated with a thin layer of methyl silicone is also employed. About 2 microliters of derivatized sample is taken by a syringe and injected onto the column. The column temperature is initially set at 80° C. and held at this temperature for 0.5 minutes. The column is then heated up to a final temperature of 350° C. at a rate of 20° C. $min.^{1-}$ and maintained at the final temperature of 350° C. for an additional 2–8 min. Peak identification is accomplished by comparison to known pure fatty acid anhydrides previously run with the GC system. The weight percent of a peak is based upon the actual response generated by the chromatograph divided by a response factor for fatty acid anhydrides of that particular compound. Response factors arc determined by comparing the actual responses of a mixture of pure anhydrides to the known amounts in the mixture. A standard for the gas chromatograph is used for subsequent rims and periodic accuracy checks.

2) Method for Measuring Level Of Difatty Ketone Of Long Chain Fatty Acid Anhydrides in Reduced Caloric Triglyceride A. Preparation of Standard Solutions Weigh approximately 50±0.05 mg of the ketone standard(s) of chain lengths inherent to the fatty acid anhydride samples being studied into separate 100 mL volumetric flasks. Take the standards to volume with pure chloroform and mix well. From this each of the resulting top level solutions is accurately transferred 500 mL of solution into separate 5 mL volumetric flash. Take these standards to volume with pure chloroform. Transfer a second 250 mL portion of each of the top level standard solutions to separate 5 ml volumetric flasks. These standards arc then taken to volume with pure chloroform and mixed well. From the solutions resulting from the 250 uL transfers take 500 uL aliquots to separate 5 mL volumetric flash. Take these standards also to volume with pure chloroform and mix well. Determine accurately the ug/mL concentrations of each solution. (These will equate to approximate concentrations of 500, 50, 25, and 2.5 ug/mL. Analogous to the approximate 0.5 gm of fatty anhydride samples to be prepared below, this equates to about 25,000, 2,500, 1,250 and 125 ppm of standards in a sample.) Transfer volumes of each standard respectively to gas chromatography (GC) sample vials having Teflon-lined caps.

B. Preparation of Samples

Weigh finely powered or liquid samples accurately (0.5±0.1 gm) into separate tared 5 mL reaction-vials with Teflon-lined screw-capped lids. Add 4 mL of pure hexane and 1 mL of pure diethylamine (DEA) and then cap and mix well. Let the samples react in a heating block for 10 minutes at 100° C. During the initial time of heating the mixtures are shaken until complete dissolution is assured. Following the ten minute reaction time remove the samples from the heating block and allow to just come to room temperature. Open each sample carefully and then transfer to separate 25 mL volumetric flasks using pure chloroform. An adequate volume of each sample is then transferred to separate GC sample vials for analysis.

C. Analysis of Calibration Samples and Unknowns

Prepared calibration samples and unknown samples are analyzed according to GC conditions described below. Calibration samples are run sequentially from lowest to highest concentrations for each standard first. Unknown samples may then be analyzed in any order.

Accurate area counts for the calibration samples are used to construct a calibration curve for quantitating the difatty ketones in the samples. The external standard approach is used. Absolute concentrations are plotted versus the area counts obtained for the different calibration levels. A linear solution is utilized for determining the concentrations of the difatty ketones in the samples.

In this analytical laboratory a chromatographic data system was used for performing the above data acquisition, analyses, and quantitation. The system used was PE Nelson's Turbochrom 3.3 utilizing a Gateway 2000 486 DX/33 computer.

D. Gas Chromatographic Instruments and Conditions

A HP 5890 Series II gas chromatograph (Hewlett Packard, Avondale, Pa.) was used to generate the data. The instrument was equipped with a HP7673A auto sampler attached to a cool on-column pressure programmed injector. The injector was set to inject 1 uL. Hydrogen was utilized as the carrier gas. The column used was a 15 meter, 0.25 mm i.d. and 0.25 um film thickness DB5 column (J&W Scientific, Folsom, Calif.). At the front of the analytical column was connected a 0.53 um i.d. 95% phenyl-5% methyl deactivated guard column (Restek, Bellefonte, Pa.). The guard column was connected to the analytical column using a SGE glass-lined miniunion. The instrument was equipped with a flame ionization detector. The analog output from the GC system was connected to a PE Nelson 900 Series Interface which, in turn was connected to the chromatography data system.

Carrier Gas and Pressure Program: Hydrogen (11.2 psi for 2.5 min. then 1.19 psi/min. to 15.5 psi and hold).

Oven Program (with injector in oven tracking mode): 60° C. initial for 2.5 min. then 25° C./min. to 150° C. with no hold. Then 10° /min. to 350° C. and hold for 5 min.

Detector Conditions: Hydrogen=~30 mL/min.; Nitrogen= 30 mL/min./; Air=~450 mL/min.; Temperature=375° C.

3. Method for Measuring Level Of Difatty Ketone of Short or Medium Chain Fatty Acid Anhydride in Reduced Calorie Triglyceride A. Preparation of standard solutions Standard solutions having approximate concentrations of 500, 50, 25, and 2.5 ug/mL of the respective di-fatty ketones am prepared as described hereinabove in the method for determining Di-fatty ketone levels of Long-chain Fatty Acid Anhydride Product. Standard solutions having approximate concentrations of 1.25 and 0.0625 ug/mL are prepared by taking 2 more dilutions of 250 uL each into 5 mL volumetric flasks and taking to volume with chloroform.

B. Preparation of Samples

The samples are prepared according to the method described hereinabove for determining ketone levels of long chain fatty acid anhydride product.

C. Analysis. Of Calibration Samples and Unknowns

Prepared calibration samples and unknown samples are analyzed according to GC conditions described hereinabove in the method for determining di-fatty ketone levels of long chain fatty acid anhydride product.

D. Gas Chromatographic Instrument and Detector Conditions

A Siemens 2–8 gas chromatograph was used to perform the chromatography. The instrument was equipped with a septumless programmed temperature vaporization (PTV) valve. Sample volumes of 0.2 uL were injected. Hydrogen was utilized as the carrier gas. The column used was a 20 meter, 0.18 mm i.d. and 0.18 um film thickness DBMS column (J & W Scientific, Folsom, Calif.). The gas chromatograph was attached via a directly coupled transfer line to an ion trap detector (ITD, Finnigan MAT)) serving as a benchtop mass spectrometry detector. The output of the ITD was directed to Finnigan Mat's TrapMaster software for acquisition and processing of the mass spectral dam. The ITD was configured in the chemical ionization mode to perform selected ion monitoring of the M++1 molecular ion for the respective di-fatty ketones (i.e., m/e 227, m/e 255 and 283, respectively, for C15 DFK, C17 DFK and C19 DFK). In this way co-eluting/interfering compounds, as noted with the use of a flame ionization detector, were not detected.

Gas Chromatographic Conditions;

Carrier Gas and Pressure: Ultra high purity Hydrogen (2.6 bar).

Oven Program: 80° C. initial for 5 min. then 25° C./min. to 100° C. with no hold. Then 5°/min. to 325° C. and no hold.

PTV Injector Program (splitless): 65° C. for 2.1 min.: 800°/min. to 340° C. with 3 min. hold.

| ITD 800 Acquisition Parameters | |
|---|---|
| Electron Multiplier: | 1350 volts |
| Manifold: | 248° C. |
| Transfer-line and interfaces: | 325° C. |
| Selected Ions Monitored by CI (isobutane): | 227, 255 and 283 amu |
| Ion Time: | 2000 usecs |
| Reaction Time: | 100 msecs |
| Ionization Level: | 9 amu |
| Reaction Level: | 22 amu |
| Background Mass: | 210 |
| Low Scan Limit: | 45 amu |

EXAMPLE

The following is a specific example of the process of the present invention:

Behenic add is reacted with glycerine to form a mixture a mono-, di- and triglyceride. The reaction is carried out as a batch reaction in a 15 $M^3$ reactor. The reaction is initially run at 160° C. and the temperature is then increased over a period of about 15 minutes to about 220° C. A vacuum of 20 mm Hg is applied. The total cycle time is 10 hours. The reaction is judged complete when the acid value is less than 0.5%.

Next, glycerolysis is conducted to shift the equilibrium of the mono/di/triglyceride mixture toward the monoglyceride. The mono/di/triglyceride is reacted in a batch reaction with a 10% excess of glycerine for 70 minutes at 255° C. This produces about 47% monoglycerides. Excess glycerine is removed in a flash column operating at 1–3 mm Hg and 190° C. The monoglyceride is then distilled in a 36$m^2$ short path evaporator operating at 235° C. and 5 microns pressure. This produces a monoglyceride with 97.5% purity at a yield of approximately 95% The di-triglyceride bottoms from the distillation are recycled to the glycerolysis reaction.

Selective esterification of the monobehenin with $C_8/C_{10}$ fatty acids is carried out in a 15 m³ reactor. Fatty acid is charged to the reactor, heated under vacuum and liquid monobehenin is added over 1 hour. The reaction is run at 200° C., and the pressure is gradually reduced from 400 mmHg to 200 mmHg to pull of the water. Nitrogen is sparged at a rate of 15 m³ to aid in water removal. The total reaction time is approximately three hours and the batch cycle time is 6 hours. The reaction is judged to be complete when the level of glycerides is less than 0.5%.

Next, about 0.5% by weight of glycerine is added to the reactor for about 10 minutes. of the fatty acid anhydrides are converted to medium chain mono-, di-, and triglycerides with only a 0.1% increase in ML diglycerides.

The crude reaction product contains approximately 77% fatty acids and 23% triglycerides. About 30% of the excess fatty acid is removed in a flash column operating at 185° C. and 2 mmHg. The remaining fatty acid is removed by a short path evaporator run at 180° C. and 0.5 mmHg. Residual behenic acid and about half of the MMM is removed by short path distillation at 235° C. and 5 microns.

The finished reduced calorie triglyceride has a difatty ketone content of less than about 20 ppm.

What is claimed:

1. A process for preparing reduced calorie triglycerides which contain short or medium and long chain fatty acids, but which have low levels of difatty ketones, which process comprises the steps of:
   A. esterifying an at least about 60% pure $C_{18}$–$C_{24}$ monoglyceride or mixture thereof with an at least about 90% $C_2$ to $C_{10}$ fatty acid or mixture thereof to provide a crude reduced calorie triglyceride containing fatty acid anhydride by-products which are difatty acid ketone precursors; and
   B. adding a hydroxyl-containing compound to the crude reduced calorie triglyceride to react and remove said fatty acid anhydrides up at least 80% such that the reduced calorie triglyceride product has a difatty ketone level of less than about 100 ppm.

2. A process according to claim 1 wherein the hydroxyl-containing compound is glycerine.

3. A process according to claim 2 wherein from about 0.01% to about 5% of glycerine is added to the crude reduced calorie triglyceride.

4. A process according to claim 3 which additionally comprises purification of the crude reduced calorie triglyceride.

5. A process according to claim 4 wherein the glycerine is added to the crude reduced calorie triglyceride before purification of the crude reduced calorie triglyceride.

6. A process according to claim 5 wherein the temperature of the crude reduced calorie triglyceride when the glycerine is added ranges from about 80° C. to about 255° C.

7. A process according to claim 6 wherein the contact time of the glycerin with the crude reduced calorie triglyceride ranges from about 1 to about 120 minutes.

8. A process according to claim 7 wherein the reduced calorie triglyceride product has a difatty ketone level of less than about 50 ppm.

9. A process according to claim 8 wherein an at least about 90% pure $C_{18}$ to $C_{24}$ saturated fatty acid monoglyceride or mixture thereof is esterified with an at least about 90% pure $C_8$ to $C_{10}$ saturated fatty acid or mixture thereof.

10. A process according to claim 9 wherein the reduced calorie triglyceride product contains less than about 1% ML-diglycerides.

11. A process according to claim 10 wherein the glycerine is added at a level of from about 0.1% to about 1.0%.

12. A process according to claim 11 wherein the temperature of the crude reduced calorie triglyceride at the time the glycerine is added ranges from about 150° to about 220° C.

13. A process according to claim 12 wherein the contact time of the glycerine and the crude reduced calorie triglyceride ranges from about 1 to about 30 minutes.

14. A process for preparing reduced calorie triglycerides which contain medium and long chain fatty acids, but which have low levels of difatty ketones, which process comprises the steps of:
   A. esterifying an at least about 90% pure $C_{18}$–$C_{24}$ monoglyceride or mixture thereof with an at least about 90% $C_8$ to $C_{10}$ fatty acid or mixture thereof at a temperature ranging from about 170° to about 215° C. to provide a crude reduced calorie triglyceride; and
   B. adding from about 0.1% to about 0.5% glycerin to the crude reduced calorie triglyceride for from about 1 to about 15 minutes to remove fatty acid anhydrides such that the reduced calorie triglyceride product has a difatty ketone level of less than about 20 ppm.

15. A process according to claim 14 where the monoglyceride is monobehenin.

* * * * *